(12) United States Patent
Fraley et al.

(10) Patent No.: US 8,657,024 B2
(45) Date of Patent: Feb. 25, 2014

(54) BOX BLADE WITH INDEPENDENTLY RETRACTABLE RIPPERS

(75) Inventors: J. Phillip Fraley, Winfield, AL (US);
John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 0 days.

(21) Appl. No.: 13/153,510

(22) Filed: Jun. 6, 2011

(65) Prior Publication Data
US 2011/0297405 A1 Dec. 8, 2011

Related U.S. Application Data

(60) Provisional application No. 61/351,401, filed on Jun. 4, 2010.

(51) Int. Cl.
*A01B 5/00* (2006.01)
(52) U.S. Cl.
USPC .......................................................... 172/196
(58) Field of Classification Search
USPC .............. 172/196, 197, 697, 684.5, 156, 199; 37/407, 304
See application file for complete search history.

(56) References Cited

U.S. PATENT DOCUMENTS

| | | | |
|---|---|---|---|
| 1,276,720 A * | 8/1918 | Carpenter ..................... | 172/271 |
| 1,635,442 A * | 7/1927 | Sigurd ......................... | 172/271 |
| 2,518,990 A * | 8/1950 | Keener ........................ | 137/355.2 |
| 2,839,851 A | 6/1958 | Geiszler | |
| 2,840,933 A | 7/1958 | Brem | |
| 3,058,243 A * | 10/1962 | McGee ........................ | 172/197 |
| 3,324,955 A * | 6/1967 | Perold ......................... | 172/136 |
| 3,430,703 A * | 3/1969 | Richey ......................... | 172/136 |
| 3,450,212 A * | 6/1969 | Sylvester ..................... | 172/699 |
| 3,539,018 A * | 11/1970 | Sprenkel ...................... | 172/484 |
| 3,752,092 A * | 8/1973 | Vinyard ....................... | 111/123 |
| 3,891,035 A | 6/1975 | Miller | |
| 3,973,632 A * | 8/1976 | Torazzi ........................ | 172/464 |
| 3,998,276 A * | 12/1976 | MacMillan .................... | 172/67 |
| 4,015,348 A * | 4/1977 | Gee et al. ..................... | 37/407 |
| D244,751 S * | 6/1977 | Watts ............................ | D15/11 |
| 4,044,838 A * | 8/1977 | Wooldridge .................. | 172/2 |
| D245,695 S * | 9/1977 | Watts ............................ | D15/11 |
| 4,159,474 A * | 6/1979 | Wooldridge .................. | 340/684 |
| 4,418,760 A * | 12/1983 | van der Lely ................. | 172/271 |
| 4,524,532 A | 6/1985 | Browning | |
| 4,553,608 A * | 11/1985 | Miskin .......................... | 172/197 |
| 4,679,635 A * | 7/1987 | Fields ........................... | 172/260.5 |
| 5,695,012 A * | 12/1997 | Kesting ........................ | 172/699 |
| 5,769,171 A * | 6/1998 | Newman, IV ................. | 172/200 |
| 5,794,714 A * | 8/1998 | Brown .......................... | 172/799.5 |
| 5,819,855 A * | 10/1998 | Tarver, III .................... | 172/166 |
| 5,911,279 A * | 6/1999 | Whitener ...................... | 172/668 |
| 6,009,955 A * | 1/2000 | Tarver, III .................... | 172/166 |
| 6,129,298 A * | 10/2000 | Nye .............................. | 241/101.73 |
| 6,257,344 B1 * | 7/2001 | Tarver, III .................... | 172/166 |
| 7,017,675 B2 * | 3/2006 | Ankenman et al. ........... | 172/146 |
| 7,575,067 B1 * | 8/2009 | Reyes .......................... | 172/684.5 |
| 2007/0107270 A1 | 5/2007 | Edmond | |
| 2007/0289757 A1 | 12/2007 | Wells | |

* cited by examiner

*Primary Examiner* — Árpád Fábián-Kovács
(74) *Attorney, Agent, or Firm* — Angela Holt Bradley Arant Boult Cummings LLP

(57) ABSTRACT

A tractor-based box blade is used to move and condition soil. The box blade has a plurality of rippers, which are forwardly- and downwardly-extending shanks terminating in relatively narrow teeth that extend into the ground. Each ripper is deployable to extend into the ground independent of the other rippers, and each ripper is stowable away from the ground independent of the other rippers. At least one scraping blade is disposed behind the rippers for smoothing soil.

3 Claims, 5 Drawing Sheets

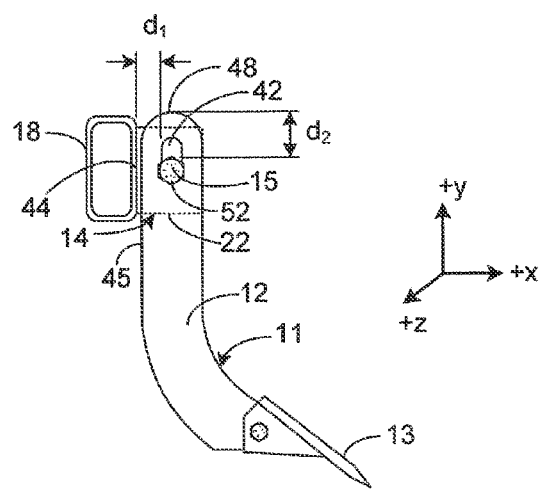
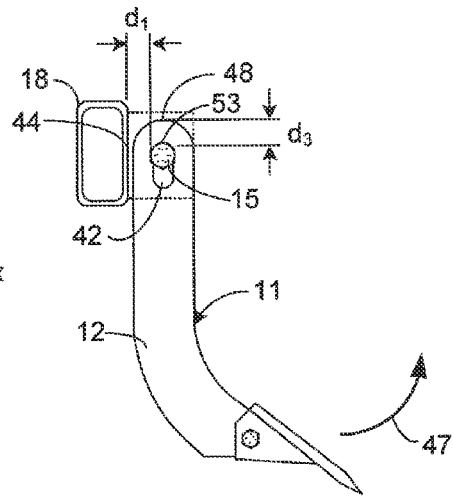
Fig. 3
Fig. 4
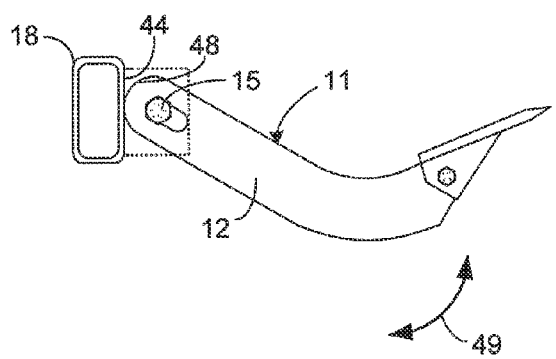
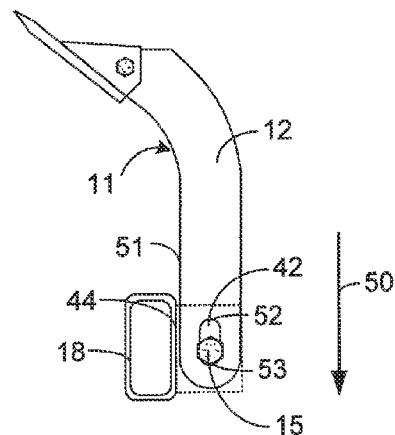
Fig. 5
Fig. 6

US 8,657,024 B2

BOX BLADE WITH INDEPENDENTLY RETRACTABLE RIPPERS

CROSS-REFERENCE TO RELATED APPLICATIONS

This application claims the benefit of U.S. Provisional Application No. 61/351,401 filed on Jun. 4, 2010, the entire contents of which is herein incorporated by reference.

FIELD OF THE INVENTION

The present invention relates generally to the field of tractor-based, three-point hitch equipment, and more particularly relates to a box blade with individual flip-over rippers.

BACKGROUND AND SUMMARY OF THE INVENTION

A tractor-based box blade is provided. The box blade attaches to the standard three point hitch of the tractor and is used to move and condition soil. Traditional box blades have rippers that extend forwardly at the front of the box blade for loosening soil and scraping blades at the rear of the box blade for scraping and smoothing soil. The rippers are generally attached to a fixed beam that extends to the sides of the box blade.

In some prior art box blades, the beam containing the rippers is rotatable such that the rippers may be rotated up, or stowed, so that they cannot contact the soil. These box blades have the limitation that the rippers are rigidly affixed to the ripper support beam such that the entire beam has to rotate in order to stow the rippers.

The box blade according to the present disclosure comprises individually rotatable rippers that are each rotatably affixed to a support beam. Each ripper may be independently flipped over, or rotated, from a deployed position in which it contacts the ground, to a stowed position. Eliminating the need for a rotating ripper support beam allows for the ripper support beam to also be part of the main structural support of the box blade, resulting in a stronger box blade with fewer moving parts.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 3 is a side plan view of an exemplary ripper, horizontal support beam, and bracket, according to an embodiment of the present disclosure, in which the ripper is in a fully deployed position.

FIG. 4 is a side plan view of the ripper, horizontal support beam, and bracket of FIG. 3, just before the ripper is rotated to a stowed position.

FIG. 5 is a side plan view of the ripper, horizontal support beam, and bracket of FIG. 3, during rotation of the ripper to a stowed position.

FIG. 6 is a side plan view of the ripper, horizontal support beam, and bracket of FIG. 3, after the ripper has been rotated to its stowed position.

DETAILED DESCRIPTION

Figure 1:
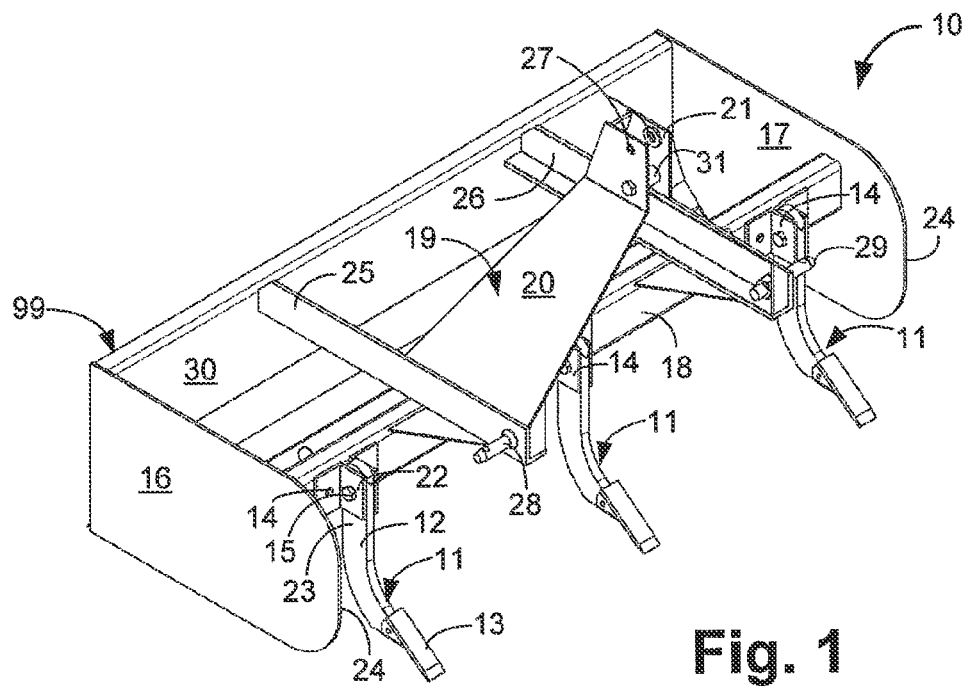
FIG. 1 is a front perspective view of an exemplary box blade in accordance with the present disclosure.

FIG. 1 is a front perspective view of a box blade 10 according to one embodiment of the present disclosure. The box blade 10 comprises a plurality of rippers 11 extending downwardly and forwardly from a horizontal support beam 18. Each ripper 11 comprises a forwardly extending ripper shank 12 and a tooth 13. The tooth 13 comprises a generally flat angled blade portion extending downwardly at an angle as shown. The teeth 13 can be replaced when they are worn or damaged.

Each ripper shank 12 extends downwardly from the horizontal support beam and curves to extend forwardly as shown and terminates at the tooth 13. Although the illustrated embodiment depicts three rippers 11 in the box blade 10, more or fewer rippers 11 may be provided without departing from the scope of the present disclosure.

The horizontal support beam 18 is generally horizontal when the box blade 10 is disposed upon a flat surface (not shown). In use, the box blade 10 may be tilted such that the horizontal support beam is not horizontal.

The box blade 10 further comprises a support frame 99 comprising a rear side 30. The rear side 30 extends generally parallel to the horizontal support beam 18 in the illustrated embodiment. A right side 16 extends forwardly and generally perpendicularly from the rear side 30. A left side 17 extends forwardly and generally perpendicularly from the rear side 30. The horizontal support beam 18 extends between and is rigidly connected to the right side 16 and the left side 17. The right and left sides 16 and 17 each comprise a flat plate of material such as sheet metal. The frontward edges 24 of the right and left sides 16 and 17 are rounded as shown in this embodiment.

The horizontal support beam 18 comprises a hollow rectangular tube in the illustrated embodiment, but may be differently shaped in other embodiments. The horizontal support beam 18 further comprises a plurality of brackets 14 which rotatably receive the rippers 11. In this regard, each ripper 11 has a corresponding bracket 14 which is rigidly affixed to the horizontal support beam 18. In the illustrated embodiment, each bracket 14 comprises two (2) outwardly extending tabs 22 spaced apart from one another. The tabs 22 receive an upper end 23 of the shank 12 of the ripper 11, which upper end 23 fits between the tabs 22. A fastener 15 passes through openings (not shown) in the tabs 22 and a slot (not shown) in the upper end 23 and rotatably affixes the upper end 23 to the bracket 14.

Each ripper 11 may be rotated within the bracket 14 from a deployed position with the ripper tooth 13 down, as shown, to a stowed position with the ripper up, as further disclosed herein.

The box blade 10 further comprises a lift frame 19 that connects to a tractor (not shown). The lift frame 19 comprises two lift arms 20 and 21 which connect to support beams 25 and 26, respectively. In the illustrated embodiment, support beams 25 and 26 are spaced apart from one another and extend generally perpendicularly from the rear side 30 of the box blade 10. Support beams 25 and 26 comprise L-shaped angle iron or the equivalent in this embodiment.

The lift arms 20 and 21 are thin angled braces that rigidly affixed to the support beams 25 and 26, respectively, by welding, for example. The lift arms 20 and 21 extend from the support beams 25 and 26 upwardly and inwardly at an angle toward one another and terminate in a spaced-apart relationship maintained by a spacer pin 31.

The lift frame 19 is connectable to the tractor's standard three point hitch (not shown) that is known in the art. The three point hitch connects at its topmost point (not shown) to the box blade 10 via a lift pin (not shown) which connects at a top of the three point hitch to an upper pin (not shown) passing through upper lift arm openings 27 of the lift arms 20 and 21. The lower two points (not shown) of the three point hitch connects to the frame 19 via lift pins 28 (disposed on support beam 25) and 29 (disposed on support beam 26).

Figure 2:
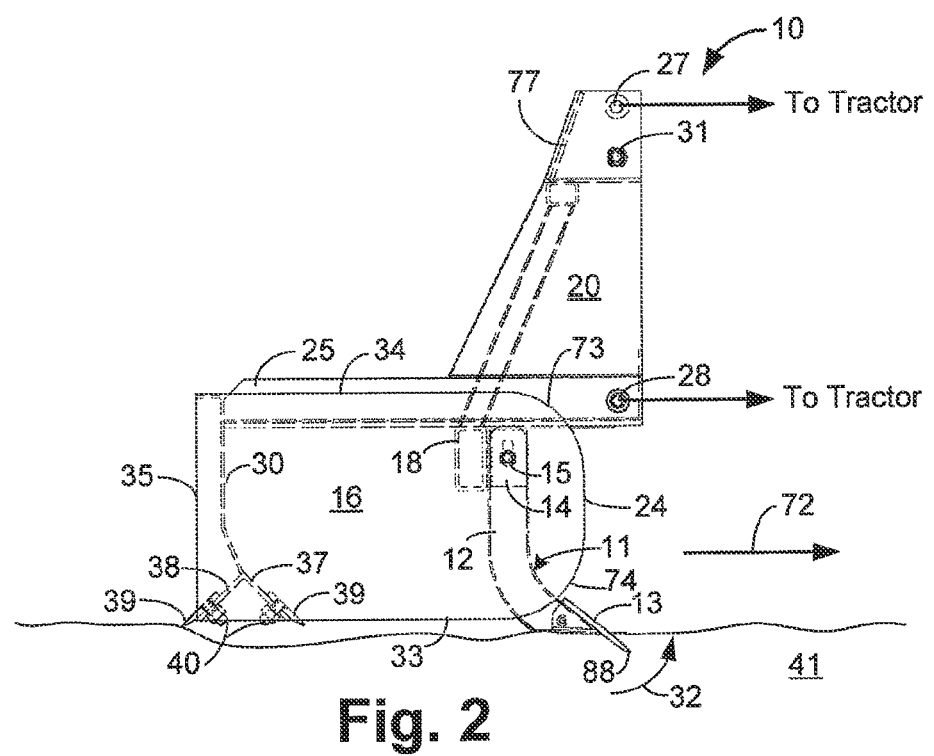
FIG. 2 is a side plan view of the box blade of FIG. 1.

FIG. 2 is a right side perspective view of the box blade 10 of FIG. 1. The right side guard 16 is generally a mirror image of the left side guard 17, and comprises a generally thin and flat plate. The right side guard 16 is rigidly affixed, by welding, for example, to the rear side 30 of the box blade 10 and also to the horizontal support beam 18. In this embodiment, the right side guard 16 comprises a generally flat bottom side 33 and a generally flat top side 34 which are generally perpendicular to a generally straight rear side 35. The frontward edge 24 has rounded corners 73 and 74 as shown.

The rear side 30 of the box blade 10 extends downwardly and forwardly and terminates in an inverted Y-shape in which a forward rear blade shaft 37 angles forward and a rearward rear blade shaft 38 angles rearward. The forward rear blade shaft 37 and the rearward rear blade shaft 38 are formed from a single piece of angle iron turned with its "legs" downward in one embodiment.

The forward rear blade shaft 37 and the rearward rear blade shaft 38 each support a scraping blade 39 that extends across the width of the box blade 10. The scraping blades 39 affix to the blade shafts 37 and 38 via a plurality of fasteners 40, and therefore the blades 39 are replaceable when damaged or worn.

The lift arm 20 extends upwardly from the support beam 25 at the frontward portion of the support beam 25 and is somewhat trapezoidal in shape. A top support plate 77 extends between the lift arm 20 and the lift arm 21 (FIG. 1). The lift pin 28 extends outwardly generally perpendicularly to the support beam 25.

In its deployed position as shown, the ripper 11 is positioned such that the ripper tooth 13 is contactable with and extends into a surface 41, for example, a surface of ground. The rippers 11 (only one of which is shown in FIG. 2) lie in generally the same plane when they are in the deployed position, i.e., front edges 88 of the teeth of the rippers are generally aligned with one another. The tractor (not shown) moves in the direction shown by directional arrow 72, pulling the box blade 10 behind it.

The scraping blades 39 extend downwardly slightly below the bottom side 33 of the side guard 16 in the illustrated embodiment. Further, as illustrated in FIG. 2, the ripper 11 and the tooth 13 extend downwardly further than the scraping blades 39. This configuration is desired because the rippers 11 may be used to break up ground that the scraping blades 39 then smooth, i.e., the rippers 11 are desired to extend further into the ground than are the scraping blades 39.

The ripper 11 is rotatable in the direction indicated by directional arrow 32 to achieve a stowed position (as shown in FIG. 3), as further discussed herein. In this regard, the ripper shank 12 rotates within the bracket 14 about the fastener 15 until the shank 12 is either in a stowed or a deployed position, as further illustrated in FIGS. 3-6.

FIG. 3 is a side view of the ripper 11, the horizontal support beam 18, and the bracket 14 with the ripper 11 in a deployed position, i.e., with the ripper 11 down and contactable with the ground (not shown). The ripper shank 12 comprises an elongated slot 42 extending through the shank 12. The shank 12 fits between the tabs 22 (only one of which is shown, in dashed lines) of the bracket 14. The slot 42 receives the fastener 15 that rotatably affixes the ripper 11 to the tabs 22 of the bracket 14.

In the deployed position, when the tractor (not shown) is moving in the +x direction, the force of the ground on the ripper tooth 13 is generally in the −x direction. This force maintains the ripper 11 in the deployed position as shown. The ripper 11 is prevented from further rotation in the clockwise direction by contact between a rear edge 45 of the ripper shank 12 with the vertical wall 44 of the horizontal support beam 18.

Further, in the deployed position, the ripper 11 is generally prevented from rotation in the counterclockwise direction by the force of the ground pushing upwards on the ripper 11. In this regard, the ground will generally push the ripper 11 upwards such that the fastener 15 is positioned at a bottom portion 52 of the slot 42, as shown. In this position the rear edge 45 of the ripper shank 12 will contact the vertical wall 44 of the horizontal support beam 18 and will not be rotatable because a distance "$d_2$" between the fastener 15, around which the ripper 11 rotates, and a top 48 of the shank 12 is larger than the distance "$d_1$" between the fastener 15 and the vertical wall 44 of the horizontal support beam 18.

FIG. 4 depicts the ripper 11 of FIG. 3, after the ripper has been pulled downward (in the −y direction) in order to begin rotation of the ripper 11 to a stowed position. In order to stow the ripper 11, the user (not shown) would generally need to raise the box blade 10 such that the ripper 11 does not contact the ground. Then the user can pull the ripper 11 downward until a top portion 53 of the slot 42 contacts the fastener 15. At this point, the distance "$d_3$" between the fastener 15 and the top 48 of the shank 12 is less than the distance "$d_1$" between the fastener 15 and the vertical wall 44 of the horizontal support beam 18. The ripper 11 can then be rotated in the counterclockwise direction, i.e., the direction indicated by directional arrow 47.

FIG. 5 depicts the ripper 11 of FIG. 3 during rotation of the ripper 11 from a deployed position (FIG. 3) to a fully stowed position (FIG. 6). Note that the top 48 of the shank 12 is rounded and generally smooth to maintain sufficient clearance between the shank 12 and the horizontal support beam 18 so that the shank 12 is not impeded from rotation by contact with the horizontal support beam 18. During rotation of the ripper 11, the ripper 11 is rotatable both clockwise and counterclockwise, as shown by directional arrow 49.

FIG. 6 depicts the ripper 11 of FIG. 3 after the ripper 11 has fully rotated to its deployed position. The ripper 11 will be prevented from further rotation in the counterclockwise direction when a front edge 51 of the shank 12 contacts the vertical wall 44 of the horizontal support beam 18. In this position, the ripper 11 can be "locked" into position by pushing the shank 12 downward (i.e., in the direction indicated by directional arrow 50), such that the slot 42 of the shank 12 "slides" along the fastener 15 until the fastener 15 contacts the bottom portion 52 of the slot 42.

Figure 7:
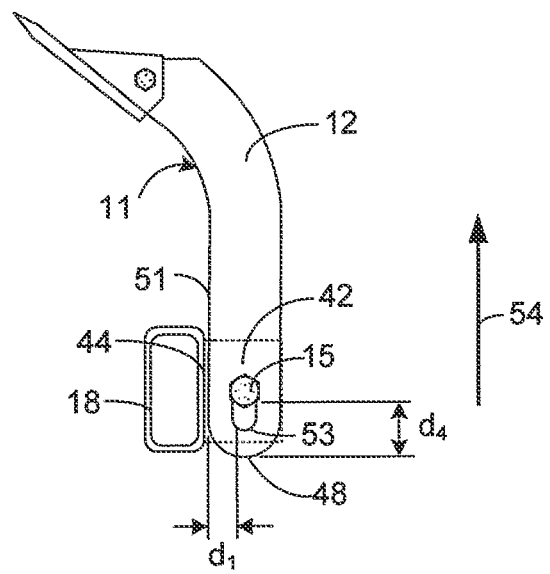
FIG. 7 is a side plan view of the ripper, horizontal support beam, and bracket of FIG. 3, after the ripper has been locked into its stowed position.

FIG. 7 depicts the ripper 11 of FIG. 1 after the ripper 11 is locked into its deployed position as discussed with respect to FIG. 6 above. At this point the ripper 11 will be prevented from further rotation in the clockwise direction because the distance "$d_4$" between the fastener 15 and the top 48 of the shank 12 is larger than the distance "$d_1$" between the fastener 15 and the vertical wall 44 of the horizontal support beam 18. In order to "unlock" the ripper 11 to return it to a deployed position, the user simply pulls upward (i.e., in the direction shown by directional arrow 54) on the shank 12 until the fastener 15 contacts the top portion 53 of the slot 42, as shown in FIG. 6, then rotates the shank 12 clockwise to a deployed position.

Figure 8:
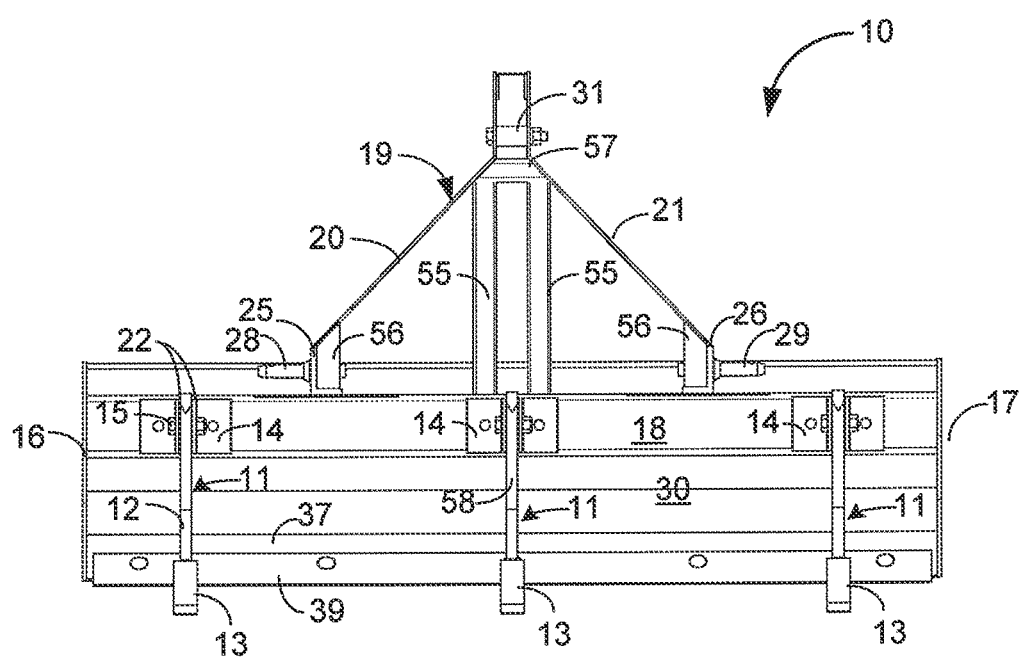
FIG. 8 is a front plan view of the box blade of FIG. 1.

FIG. 8 depicts a front view of the box blade 10 of FIG. 1, with the rippers 11 in the fully deployed position. In this embodiment, the rippers 11 are spaced equally apart from one another. Each ripper 11 is rotatably retained by its bracket 14. Each bracket 14 comprises two outwardly extending tabs 22 spaced apart to receive the shank 12 between them. In the illustrated embodiment, each bracket is comprised of two (2) pieces of angle iron welded to the horizontal support beam 18.

The fastener 15 extends through the tabs 22 and rotatably retains the shank 12 of the ripper 11. In this regard, the shank 12 may rotate freely around the fastener 15 unless impeded by the horizontal support beam 18, as discussed above with respect to FIGS. 3-7.

The lift frame 19 is comprised of lift arms 20 and 21, which are welded to support beams 25 and 26, respectively, at the lower ends of the lift arms 20 and 21. Supports 56 are flat pieces of material such as sheet metal welded to the frontmost ends of the support beams 25 and 26 and to the lift arms 20 and 21 as shown, to provide additional structural support to the lift frame 19. A top support 57 extends between and is welded to the lift arms 20 and 21. The top support 57 is a trapezoidal piece of hollow rectangular tubing in this embodiment, as further illustrated in FIG. 10.

Two support tubes 55 extend from the top of the horizontal support beam 18 upwardly to the top support 57. The support tubes 55 are comprised of hollow rectangular tubing in this embodiment. The support tubes 55 are spaced apart from one another such that when the rippers 11 are stowed, the centermost ripper 58 extends between the support tubes 55, as further illustrated in FIG. 9. In this manner, the lift frame 19 provides sufficient clearance for the ripper 11 to be stowed without interfering with the lift frame.

The scraping blade 39 extends horizontally across the forward rear blade shaft 37 and provides a wide scraping surface for working the ground (not shown). In the illustrated embodiment each tooth 13 is generally one and a half inches wide; in other embodiments, the teeth are differently dimensioned. However, in general, the teeth are fairly narrow in comparison with the width of the scraping blade 39.

Figure 9:
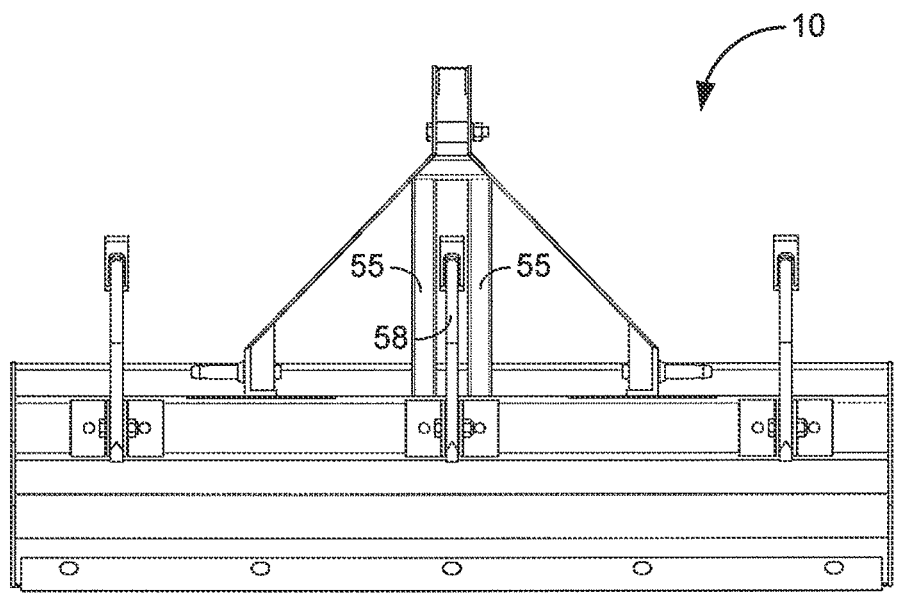
FIG. 9 is a front plan view of the box blade of FIG. 1, with the rippers in their stowed position.

FIG. 9 is a front view of the box blade 10 of FIG. 1, with the rippers 11 in their stowed position. In this position, the central ripper 58 is shown extending between the two support tubes 55, as discussed above with reference to FIG. 8.

Figure 10:
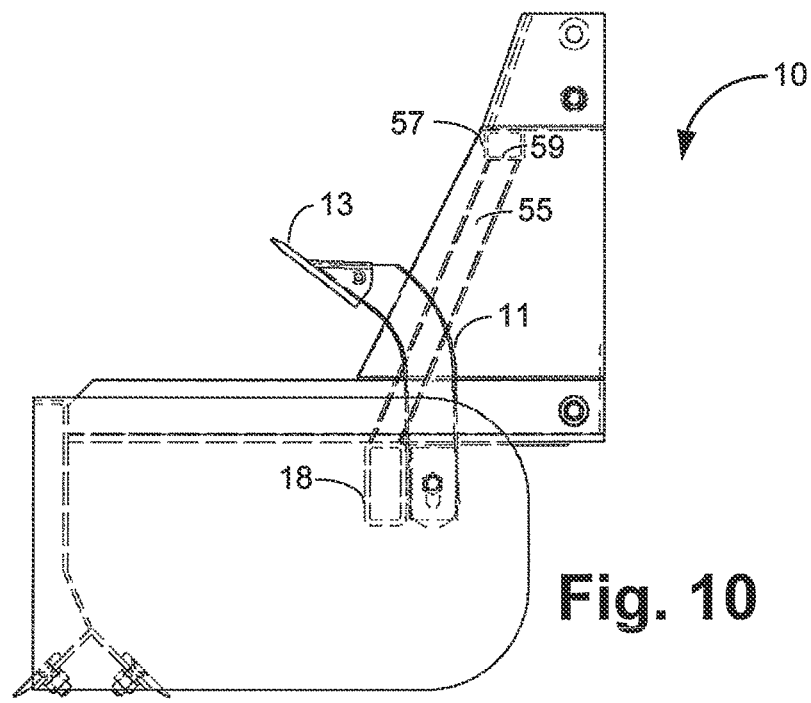
FIG. 10 is a side plan view of the box blade of FIG. 1, with the rippers in their stowed position.

FIG. 10 is a side view of the box blade 10 of FIG. 1, with the rippers 11 in their stowed position. The support tubes 55 (only one of which is shown in FIG. 10), extend upwardly and at an angle from the horizontal support beam 18 to the top support 57. The top support 57 is comprised of hollow rectangular tubing in one embodiment, with a bottom side 59 that is welded to the support tubes 55.

Figure 11:
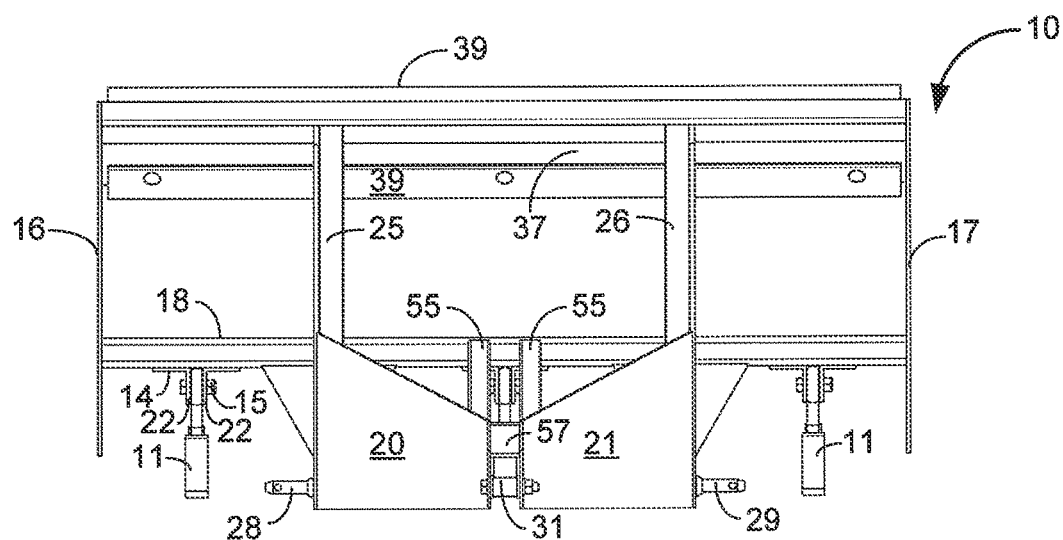
FIG. 11 is a top plan view of the box blade of FIG. 1.

FIG. 11 is a top view of the box blade 10 of FIG. 1, with the rippers 11 in their deployed position. The lift pins 28 and 29 extend outwardly from the support beams 25 and 26 and are releasably connectable to the bottom two points (not shown) of the tractor's three point hitch (not shown). The spacer pin 31 extends between and is releasably affixed to the lift arms 20 and 21. The top support plate 77 extends between and is rigidly affixed to the lift arms 20 and 21. In the illustrated embodiment, the top support plate 77 is affixed to the lift arms by welding.

Figure 12:
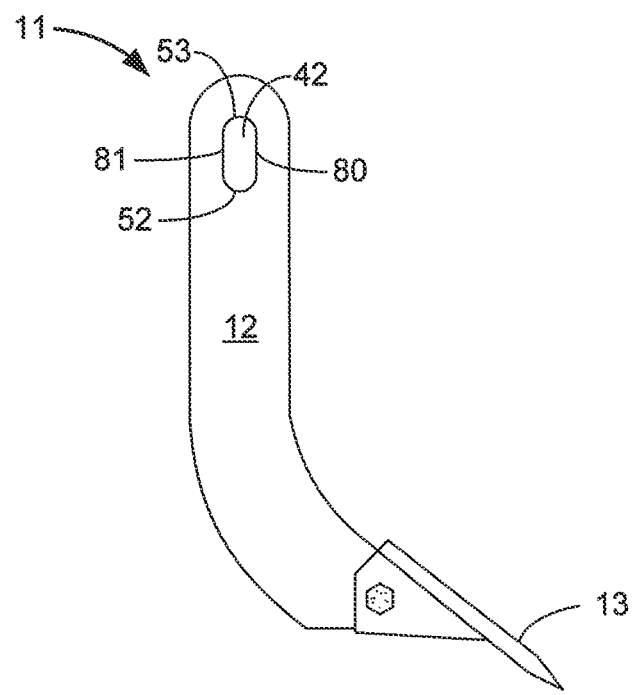
FIG. 12 is a side plan view of a ripper according to an embodiment of the present disclosure.

FIG. 12 is a side plan view of the ripper 11 according to an embodiment of the present disclosure. The slot 42 is an elongated opening formed by a generally semi-circular top portion 53, a generally semi-circular bottom portion 52, and generally straight sides 80 and 80 extending between the top portion 53 and the bottom portion 52.

What is claimed is:

1. A box blade comprising:
a plurality of rippers for extending into a surface, each ripper comprising an elongated slot extending therethrough;
at least one scraping blade contactable with the surface. the scraping blade disposed rearwardly from the rippers;
a generally horizontal support beam that extends across the box blade generally perpendicular to a direction of motion of the box blade, the support beam comprising a plurality of brackets, each bracket rotatably receiving a ripper, each bracket comprising a fastener extending through the elongated slot, the fastener rotatably affixing, the ripper to the bracket, the ripper rotatable around the fastener from a deployed position into a stowed position, each ripper rotatable deployable and retractable by a user, each ripper deployable and retractable independently from a position of the remaining rippers, wherein the ripper is rotatable around the fastener from the deployed position in which a ripper tooth is contactable with the surface, into the stowed position in which the ripper is rotated substantially 180 degrees until a ripper shank contacts a vertical wall of the horizontal support beam, and, wherein the ripper is lockable by pushing the ripper downward after the ripper is in stowed position, thus causing the fastener to contact a bottom portion of the elongated slot.

2. A box blade comprising;
a frame having a rear side a right side extending, forwardly from the rear side, and a left side extending forwardly from the rear side;
a support beam extending between and rigidly affixed to the right side and the left side, the support beam comprising a plurality of brackets, each bracket rotatbly receiving a ripper, each bracket comprising a fastener extending through an elongated slot in the ripper, the fastener rotatably affixing the ripper to the bracket, the ripper rotatable around the fastener from a deployed position into a stowed position in which the ripper is rotated substantially 180 degrees until a ripper shank contacts a vertical wall of the support beam, each ripper rotatably deployable and retractable by a user, each ripper deployable and retractable independently from a position of the remaining rippers, each ripper extendable into a surface when it is in a deployed position, wherein the ripper is lockable by pushing the ripper downward after the ripper is in stowed position, thus causing the fastener to contact a bottom. portion of the elongated slot;

a scraping blade coupled to a lower edge of the rear side, the scraping blade contactable with the surface.

3. A box blade comprising:

a first ripper;

a second ripper;

a third ripper, the first, second, and third rippers each rotatably affixed to a fixed support beam extending substantially horizontally across the box blade, the first, second and third rippers each independently deployable by a user such that the rippers extend into a surface when the rippers are in a deployed position, and each ripper independently stowable by a user such that the rippers are not extendable into the surface when the rippers are in a stowed position, each ripper comprising an elongated slot extending therethrough;

a scraping blade disposed behind the first, second and third rippers, the scraping blade contactable with the surface;

a plurality of brackets, each bracket rotatably receiving a ripper, each bracket comprising a fastener extending through the slot, the fastener rotatbly affixing the ripper to the bracket, the ripper is rotatable around the fastener from the deployed position in which a ripper tooth is contactable with the surface, into the stowed position in which the ripper is rotated substantially 180 degrees until a ripper shank contacts a vertical wall of the support beam, wherein the ripper is lockable by pushing the ripper downward after the ripper is in stowed position, thus causing the fastener to contact a bottom portion of the elongated slot.

\* \* \* \* \*